INVENTORS
ROBERT A. MERCURI
JOHN M. FINN, JR.
EDWIN M. NELSON

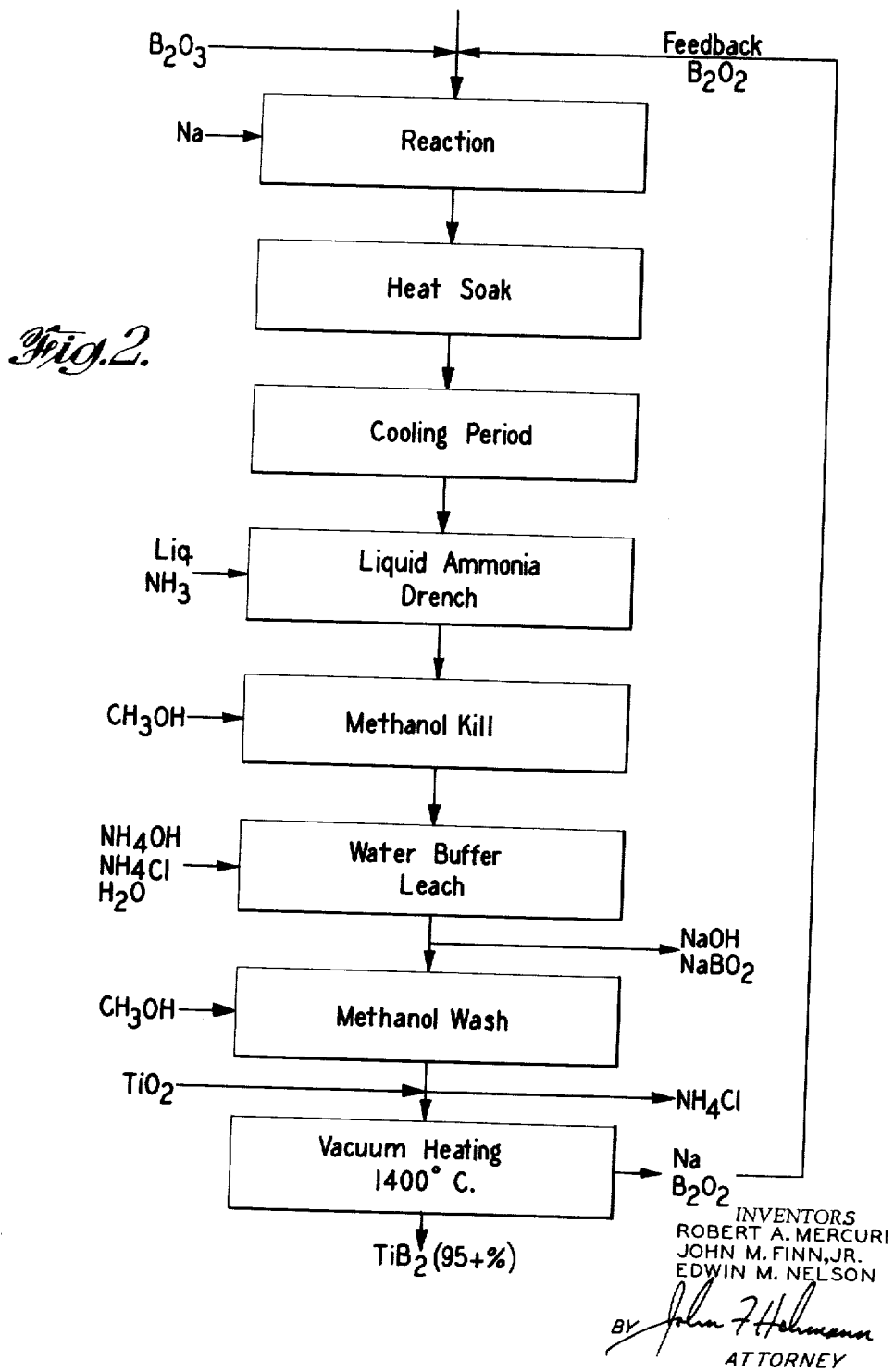

2,998,302
PREPARATION OF TITANIUM DIBORIDE

Robert A. Mercuri, Westlake, and John M. Finn, Jr., Cleveland, Ohio, and Edwin M. Nelson, United States Army, assignors to Union Carbide Corporation, a corporation of New York
Filed June 25, 1958, Ser. No. 744,508
6 Claims. (Cl. 23—204)

This invention relates to a process of making titanium diboride and more particularly relates to a process of making titanium diboride whereby the product is characterized by small particle size and high purity.

Materials having high melting points generally exhibit a tendency to agglomerate during their preparation when they are the product of high temperature reactions. Such has been the case of titanium diboride which has a melting point of about 3000° C. Because of its high melting point and dimensional stability, titanium diboride may be used extensively as a refractory material. However, it is extremely hard, and difficulty has been encountered in reducing the titanium diboride, resulting from the various methods of making it, to the appropriate size for molding into appropriate shapes. Titanium diboride is further useful as a reactant in chemical synthesis but its use has not attained great popularity because of its high cost. Another factor which has held titanium diboride from realizing its full commercial potential is the fact that the relatively large size particles conventionally produced are not as reactive or as pure as desired.

It is therefore the principal object of this invention to provide a process for the production of titanium diboride which avoids the disadvantages of large particle size and high cost.

More specifically, it is an object of this invention to provide a process which initially produces titanium diboride in small particle size and of high purity.

It is a further object of this invention to produce titanium diboride by a reaction at a relatively low temperature as compared with its melting point.

These objects are realized by this invention which comprises reacting oxygenated boron and titanium compounds in a molten sodium bath to produce crude titanium diboride. The product is then purified and small particle size, high purity titanium diboride is recovered. The principal reaction which takes place in a sodium bath, utilizing oxides of titanium and boron as reactants, is believed to be:

$$10Na + TiO_2 + 6B_2O_3 \rightarrow 10NaBO_2 + TiB_2$$

which proceeds at atmospheric pressure, at a temperature between 450° C. and 880° C. and is generally exothermic.

The oxygenated titanium and boron compounds are mixed and added to premelted sodium at such a rate that the exothermic reaction shown above does not proceed too rapidly. Upon completion of the reaction, the bath is cooled to solidify it, and the resulting mass is leached, with a succession of solvents for the various impurities, leaving a relatively pure titanium diboride product. This product is then further purified by subjecting it to a vacuum calcination treatment which removes most of the remaining impurities including the sodium, leaving a product of better than 95% pure titanium diboride.

This invention will best be understood with reference to the accompanying drawing in which:

FIG. 2 is a flow sheet of a modification of the process of this invention.

Figure 1:
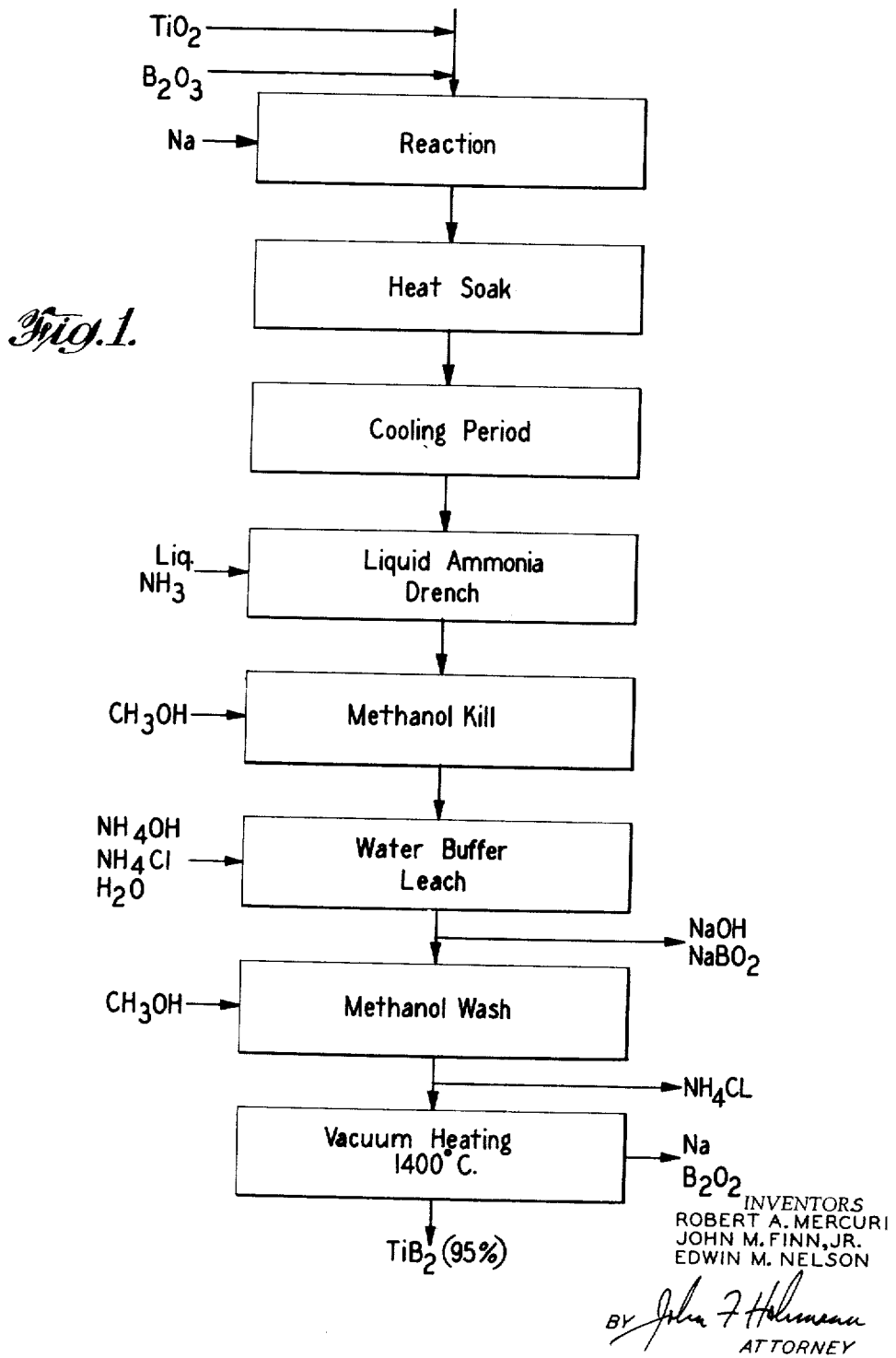
FIG. 1 is a flow sheet of the process of this invention.

With reference to the drawings, the preferred form of this invention, shown in FIG. 1, encompasses blending the starting reactants, preferably titanium dioxide and boric oxide each in finely divided form (not larger than about 60 mesh, Tyler Standard), in stoichiometric proportions and adding the blend to a sodium bath which is maintained at a temperature below its boiling point, preferably between 600° C. and 750° C. Upon completion of the reaction and cooling of the reaction mass, a series of leaching treatments, with ammonia, methanol, and a buffered aqueous solution of ammonium chloride and ammonium hydroxide, and a methanol wash purify the reaction product. The purification accomplishes the removal of sodium borate, sodium hydroxide and other reaction impurities, to a sufficient extent that the residue may be subjected to calcining at a temperature between 1400° C. and 1490° C. at subatmospheric pressure in the presence of an inert gas. Preferably, the calcining purification step is carried out at pressures between 1 and 0.1 micron in an argon atmosphere. The calcining step removes the remaining reaction impurities, in particular sodium and boron monoxide, and a fine particle size product, between 10 and 50 microns, of better than 95% purity is recovered.

This method may be conveniently modified as shown in FIG. 2 by initially reducing boric oxide to boron in a molten sodium bath. The boric oxide, finely divided, is added to the molten sodium bath where the reaction:

$$2B_2O_3 + 3Na \rightarrow B + 3NaBO_2$$

is believed to take place. The products of the reaction are cooled and leached with ammonia, methanol, and an aqueous solution of ammonium chloride and ammonium hydroxide, thereby removing sodium hydroxide and sodium borate and leaving substantially pure boron mixed with sodium values.

The water-wet boron is treated with methanol or other suitable volatile organic solvents such that the water is removed. Finely divided titanium dioxide is mixed with the thus formed methanol-wet boron. The addition of the titanium dioxide is followed by a gentle heating in vacuum to remove the methanol. The material is then subjected to vacuum calcining under which conditions the reaction:

$$TiO_2 + 4B \rightarrow TiB_2 + B_2O_2 \text{ (gas)}$$

is believed to proceed. This step also removes most of the impurities, including the sodium values from the reaction product, leaving a residue of more than 95% pure titanium diboride.

The methanol-wet boron is analyzed for boron and oxygen just prior to the addition of the titanium dioxide and a calculated amount of the oxide is added according to the stoichiometry of the reactions:

$$B + O \rightarrow \tfrac{1}{2} B_2O_2$$
$$4B + TiO_2 \rightarrow TiB_2 + B_2O_2 \text{ (gas)}$$

The boron monoxide formed with the titanium diboride and the sodium removed by the calcining treatment are recycled and fed into the molten sodium bath with the boric oxide to make up part of the oxygenated boron compound and sodium feed.

The equipment necessary for production according to the process of this invention is rather simple, the reaction taking place in a steel or nickel base alloy crucible equipped with an agitator of a nickel base alloy. The reactants, except the sodium, are blended in a closed, hopper-type of vessel and are fed into the crucible from the hopper at the proper rate. Temperature regulation is accomplished by means of a thermocouple protected by a nickel base alloy tube.

As specific examples of this invention, the following may be cited.

Example I

Boric oxide particles (about 60 mesh, Tyler Standard), in amount of 5.2 parts by weight, were blended with one part by weight of titanium dioxide particles (about 100 mesh, Tyler Standard) in a conventional blender. After thorough mixing, the charge was transferred to a closed hopper equipped with a valve in the base thereof. The mixture was added through the valve to about six parts by weight of agitated molten sodium contained within a reaction crucible. This proportion of sodium was in excess of the quantity corresponding to stoichiometry in order to insure a complete reaction. Addition was at such a rate that the exothermic reaction:

$$TiO_2 + 6B_2O_3 + 10Na \rightarrow 10NaBO_2 + TiB_2$$

did not proceed too rapidly and the reaction mass maintained a temperature between 600° C. and 750° C. Upon completion of the reaction, that is, when the specified proportions of the reactants had been consumed and the mass stopped evolving heat, the reaction products were cooled and subjected to a series of leaches with ammonia, methanol and an aqueous solution of ammonium chloride and ammonium hydroxide at a pH of 9 thereby removing the major portion of the impurities to yield a product of approximately 81.9% titanium diboride. X-ray analysis of this product showed titanium diboride as a crystalline phase; however, a small amount of an amorphous phase containing oxygen was also observed. It was then necessary to further purify the reaction product by subjecting it to a calcination treatment at a temperature which ranged from 1400° C. to 1490° C. under an argon atmosphere at a pressure of 0.0001 millimeter, or 0.1 micron. The product recovered after this calcination treatment was analyzed and found to be 96.8% pure titanium diboride.

Example II

One part-by-weight of finely divided boric oxide (about 60 mesh, Tyler Standard) was added to one part-by-weight of molten agitated sodium, such quantity of oxide being in excess of that required by stoichiometry in order to insure a complete reaction. The mass was maintained at a temperature between 600° C. and 880° C. until the reaction:

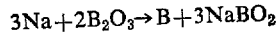
$$3Na + 2B_2O_3 \rightarrow B + 3NaBO_2$$

was complete. The reaction products were then cooled and subjected to successive leaches with ammonia, methanol and an aqueous solution of ammonium hydroxide and ammonium chloride at a pH of 9. The leached product was then analyzed for boron and oxygen and found to consist of 93.3% B. A mole ratio of 3.85 boron to titanium was obtained by mixing 6.53 parts by weight of finely divided titanium dioxide (about 100 mesh) with 3.55 parts by weight of the previously obtained boron. The titanium dioxide was then converted to titanium diboride by reaction with boron at a temperature of 1450° C. to 1490° C. for 7 hours. The system was kept at a pressure of 0.1 micron in an argon atmosphere for this time and in addition to the reaction proceeding, the product was purified so that a yield of 5.06 parts by weight of titanium diboride, or about 50% of the theoretical yield was recovered. The product had a particle size ranging from 10 to 50 microns, with about 70% of it at 10 microns.

Example III

The reaction carried out here was the same as that discussed in Example II above, however, the quantities of boric oxide and sodium utilized as reactants were varied so as to result, after leaching, in 2.55 parts by weight boron available to react with titanium dioxide. A mole ratio of 4.92 boron to titanium was achieved by adding 3.57 parts by weight of titanium dioxide to the boron and this mass was heated to a temperature of 1480° C. for 4 hours under an argon atmosphere and a pressure of 0.4 micron. A product of 2.87 parts by weight titanium diboride of fine particle size and at a purity of 95.5% was recovered from this process.

What is claimed is:

1. A process of making fine particle size titanium diboride comprising blending titanium dioxide of a particle size smaller than about 100 mesh with boric oxide of a particle size at most about 60 mesh, adding said blend to a molten sodium bath at a temperature between 450° C. and 880° C., agitating said bath until the reaction is complete, cooling the reaction mixture and recovering less than about 50 micron particle size titanium diboride of at least 95% purity.

2. A process of making fine particle size titanium diboride comprising blending titanium dioxide of a particle size smaller than about 100 mesh with boric oxide of a particle size smaller than about 60 mesh, adding said blend to a molten sodium bath between 600° C. and 750° C., reacting said oxides with said sodium, cooling the reaction products, removing the reaction impurities and recovering titanium diboride of at least 95% purity in a particle size less than about 50 microns.

3. A process of making fine particle size titanium diboride comprising blending titanium dioxide of a particle size smaller than about 100 mesh with boric oxide of a particle size at most about 60 mesh, adding said blend to a molten sodium bath at a rate sufficient to maintain a temperature between 600° C. and 750° C., reacting said oxides with said sodium, cooling the reaction products, leaching out most of the reaction impurities, heating the impure product to a temperature between 1400° C. and 1490° C. at subatmospheric pressure in the presence of an inert gas, and recovering less than about 50 micron particle size titanium diboride of at least 95% purity.

4. A process of making fine particle size titanium diboride comprising blending 100 mesh titanium dioxide with 60 mesh boric oxide, reacting said blend with molten sodium at a temperature between 450° C. and 880° C., agitating the molten mass until the reaction is complete, cooling the reaction products, leaching out most of the reaction impurities, vacuum calcining the impure product under an inert atmosphere and recovering titanium diboride of at least 95% purity and of a particle size between 10 and 50 microns.

5. A process of making fine particle size titanium diboride comprising reducing boric oxide of a particle size at most 60 mesh in a molten sodium bath at 450° C. to 880° C. to provide boron, leaching out the reaction impurities, adding titanium dioxide of a particle size smaller than about 100 mesh to said leached product, reacting said titanium dioxide with said boron to produce titanium diboride in said sodium bath, vacuum calcining the later impure reduction product at a temperature between 1400° C. and 1490° C., and recovering less than about 50 micron particle size titanium diboride of at least 95% purity.

6. A process of making fine particle size titanium diboride comprising adding boric oxide of a particle size about 60 mesh to a molten sodium bath at a temperature between 600° C. and 750° C., reducing said oxide with said sodium to elemental boron, adding titanium dioxide of a particle size about 100 mesh, reacting said titanium dioxide with said boron, vacuum calcining the impure reaction product at a temperature between 1400° C. and 1490° C. under an inert atmosphere and recovering titanium diboride of at least 95% purity in a particle size less than about 50 microns.

References Cited in the file of this patent

UNITED STATES PATENTS

| | | |
|---|---|---|
| 2,678,870 | Cooper | May 18, 1954 |
| 2,735,155 | Glaser | Feb. 21, 1956 |

(Other references on following page)

OTHER REFERENCES

Schechter et al.: "Boron Hydrides and Related Compounds," 2nd ed., PB 130154, printed May 1954, declassified Jan. 6, 1958, page 143.

Friend: "Textbook of Inorganic Chemistry," 1917, vol. IV, pp. 7, 8.

Ullman: "Encyklopadie Der Technischen Chemie," 3rd ed., 1953, vol. 4, pp. 604–605.

Ephraim: "Inorganic Chemistry," 4th ed., 1943, p. 849, 181.

Mellor: "Comprehensive Treatise on Inorganic and Theoretical Chemistry," 1922, vol. II, p. 470.

Kieffer et al.: "Zeitschrift fur Anorganische und Allgemeine Chemie," vol. 268, No. 3, pp. 191–200, May 1952.

UNITED STATES PATENT OFFICE

CERTIFICATE OF CORRECTION

Patent No. 2,998,302  August 29, 1961

Robert A. Mercuri et al.

It is hereby certified that error appears in the above numbered patent requiring correction and that the said Letters Patent should read as corrected below.

Column 4, line 53, for "later" read -- latter --.

Signed and sealed this 6th day of February 1962.

(SEAL)
Attest:

ERNEST W. SWIDER
Attesting Officer

DAVID L. LADD
Commissioner of Patents